United States Patent [19]

Ron

[11] Patent Number: 4,607,826
[45] Date of Patent: Aug. 26, 1986

[54] APPARATUS FOR PREPARING IMPROVED POROUS METAL-HYDRIDE COMPACTS

[75] Inventor: Moshe Ron, Haifa, Israel

[73] Assignee: Technion Research and Development Foundation Ltd, Haifa, Israel

[21] Appl. No.: 667,759

[22] Filed: Nov. 2, 1984

Related U.S. Application Data

[62] Division of Ser. No. 518,341, Jul. 29, 1983, Pat. No. 4,507,263.

[51] Int. Cl.[4] ............................................... B22F 3/00
[52] U.S. Cl. ....................................... 266/251; 425/78; 425/407; 425/405 R; 266/252
[58] Field of Search .............. 425/78, 405 H, 407; 266/251, 252, 255

[56] References Cited

U.S. PATENT DOCUMENTS 4,240,780 12/1980 Carcey ................................. 425/407
4,292,265 9/1981 Ron et al. ............................. 264/82
4,325,734 4/1982 Burrage et al. ....................... 75/225

Primary Examiner—Christopher W. Brody
Attorney, Agent, or Firm—Browdy and Neimark

[57] ABSTRACT

The present invention relates to a method and apparatus for preparing metal-embedded porous metallic-hydride (pmh) compacts capable of with standing repeated hydriding-dehydriding cycles without disintegrating. According to the invention, the finely divided hydridable metal alloy hydride is admixed with a finely divided metal selected from Al, Ni, Cu or other transition metals and charged with hydrogen. The resulting mixture is sintered in a furnace in which hydrogen is introduced at a pressure above the equilibrium pressure to the prevailing temperature, mechanical stress being applied simultaneously. The compacts obtained possess outstanding stability, as shown by the fact that they have remained intact even after more than 6000 cycles.

4 Claims, 5 Drawing Figures

APPARATUS FOR PREPARING IMPROVED POROUS METAL-HYDRIDE COMPACTS

This is a division of application Ser. No. 518,341 filed July 29, 1983 now U.S. Pat. No. 4,507,263.

The present invention relates to a method and an apparatus for preparing improved porous metal-hydride (pmh) compacts. More specifically, this invention relates to a method and apparatus for preparing metal-embedded porous metallic-hydride (pmh) compacts capable of withstanding repeated hydriding-dehydriding cycles without disintegrating.

The utilization of hydrogen—an ideal, nonpolluting fuel—as an alternative to fossil fuels is attracting much attention. Hydrogen has been suggested as a working fluid in a closed system utilizing thermal energy from low-grade heat sources to provide industrial and residential space heating. Hydrogen is also being considered for use in vehicle propulsion and in electric peak shaving systems such as fuel cells for producing electricity during peak periods of demand. Also, the use of hydrogen as a chemical heat pump for applications in refrigeration and for upgrading low-quality heat energy is presently under investigation.

In our Israeli Pat. No. 55403 a hydrogen-based method for air conditioning of vehicles was described, the hydrogen being absorbed and desorbed by a metal hydride system.

The use of metal hydrides produced in a reversible chemical reaction with hydrogen provides an excellent solution to the hydrogen storage problem. Heat must be removed and supplied in order that the reactions can proceed. Hydrogen storage units consisting of sealed containers filled with a metal hydride bed and subsystems for heating, cooling and pressure control, have been constructed and utilized. However, for the effective utilization of such systems, the heat transfer rate is of major concern.

Thus far the metal hydrides considered for hydrogen storage have predominantly been in the form of powders—and powders have a very low thermal conductivity. The poor heat transfer capabilities of a powder metal hydride bed thus considerably restrict the design and construction of hydride storage systems using this kind of medium. Metal hydride powders are usually of a fine particle size, which makes it necessary to use filters to prevent the particles from being entrained in the gas stream. Furthermore, repeated cycling causes the fine particles to become even further reduced in size, leading to filter congestion and increasing the pressure drop throughout the hydride bed. In most of these applications the hydrogen flow is controlled by the heat transfer rate. Complicated high-surface-area heat exchanges must therefore be used if fast cycling is required.

Attempts have been made to improve the heat transfer capabilities of the metal hydride beds. For example, the hydrides have been placed in containers of small dimensions in the direction of the heat flow and filled with a highly porous metallic foam in addition to the hydride powder, but it has proved difficult properly to seal these containers against the leakage of hydrogen. Other complicated heat exchanger configurations placed within a bed of the powdered metal hydrides have been tried, but none have been practically successful.

Compacted porous solids of hydrides supported by a thin metal matrix which does not absorb hydrogen had also been suggested (M. Ron, 11th I.E.C.E.C. 1976 proceedings, p. 954–61). It has been calculated that these porous metal hydrides ought to show greatly improved thermal conductivity and diffusivity. (M. Ron and M. Elmelech, Inter. Symposium on Hydrides for Hydrogen-energy storage Proceedings, Norway, 1977). The preparation of such porous metal hydride compacts has been tried with materials such as aluminum, nickel and copper, as the binding metal matrix, by such methods as liquid-phase sintering, solid-state sintering and high-pressure compaction at room temperature. It was found, however, that none of these methods is capable of producing a compact sufficiently strong to withstand the stresses arising from volume increases due to the formation of the metal hydrides. While absorbing hydrogen, each hydride particle swells and imposes a compressive stress on the adjoining hydride particles, which builds up to very high levels at a distance of a few coordination spheres. The binding materials are unable to withstand these stresses and compacts made in this manner begin to disintegrate after one or two hydriding-dehydriding cycles, reducing the hydride to powder and cancelling the enhanced heat transfer capabilities afforded by the porous compact.

In a recent U.S. Pat. No. 4,292,265 a method is described for preparing porous metallic-matrix hydride compacts which can be repeatedly hydrided and dehydrided without disintegration. According to the Examples given in the said Patent, even after 14 cycles no visible spalling of the compacted hydrides occurs. The method consists in preparing a mixture of a finely divided metal hydride and a finely divided matrix metal and contacting it with a poisoning agent (e.g. $SO_2$ or CO) which prevents the metal hydride from dehydriding at room temperature and atmospheric pressure. In a subsequent step, the mixture is compacted under pressure at room temperature, resulting in the porous metallic-matrix hydride compacts. Although repeated use, viz. for fourteen cycles of this porous metal hydride without disintegration could be considered as an improvement in this art, the method suffers from the presence of remnants of the poisoning agents, which ultimately have an adverse effect on the mechanical stability and hydrogen-desorption properties. Spalling does, however, set in when the number of hydriding—dehydriding cycles is increased beyond 14. It is therefore an object of the present invention to provide a method for preparing improved p m h (porous metal hydride) compacts without using poisoning agents as an intermediate step. It is another object of the present invention to provide a method for preparing pmh compacts that can withstand hydriding and dehydriding for a practically unlimited number of cycles without disintegrating.

Thus the present invention consists in a method for preparing improved porous metal hydrides composed of sintered metal-embedded porous metal hydride compacts which comprises the steps of:

(a) Preparing an intimate mixture in powder form of a finely hydridable metal alloy hydride and of a finely divided metal serving as embedding material;

(b) hydriding said powder by charging it with hydrogen, and sintering the hydrided metal-embedded metal hydride in a furnace wherein hydrogen is supplied at a pressure above the equilibrium pressure appropriate to the prevailing temperature and mechanical stress is applied simultaneously.

It has been found that by carrying out the above steps, sintering of the metal particles takes place, bonding the metal hydride particles into stable compacts. These compacts possess outstanding stability, as shown by the fact that they have remained intact even after more than 6000 cycles.

According to another embodiment, the mixture of metal powder and hydrided metal hydride obtained in step (b) is first compressed into pellets by conventional compacting means at room temperature and hydrogen pressure. This embodiment may be preferred particularly for certain hydrides which require a more rigorous control for achieving complete hydriding of the metal hydrides prior to the sintering step.

The metal to be sintered together with the metal hydride particles may in principle be any metal that is inert in regard to hydrogen and will plastically flow under mechanical pressure at a relatively low temperature, possses good heat transfer characteristics, and is capable of acting as a binder for the metal hydride particles. Metals particularly suitable are aluminum, nickel, and other transition metals. The amount of embedding metal in the compact should be kept to minimum in order to keep the hydrogen capacity of the metal hydride as high as possible. Preferably it will range from about 7 to about 30% by weight of the total compact. The particle size of the embedding metal powder is not critical, but it should be relatively small, such as from about 1 to 10$\mu$. It is also preferable that the materials should be maintained, generally oxide-free, in order to aid compaction of the particles.

In the first step the metal hydride (or hydridable metal) and metal powder should be thoroughly dispersed in each other to form a good mixture. If necessary, the mixture may be comminuted by any appropriate means, such as ball milling, that will provide a good mixture of both materials and will also act to reduce the hydridable metal hydride to a very fine powder, of a particle size preferably not larger than about 20 microns and down to as small as about 5 microns. It may be desirable to wet the powder with alcohol to prevent oxidation of the hydride if it is exposed to the ambient atmosphere.

In the second step, the finely divided hydridable metal hydride or mixture of metal hydride and metal powder is hydrided by contact with hydrogen gas at a pressure sufficient enough to hydride the hydridable metal—hydride. Generally a pressure from about 100 to about 500 psi has been found satisfactory to accomplish this, although higher hydrogen pressures may be desirable.

After the hydriding step, according to one embodiment, the metal hydride and metal powder mixture is compressed by any suitable compacting means at room temperature and at a pressure sufficient for causing the metal to flow plastically and bind the metal hydride particles together to form a compact. Usually, pressures of about 160 kpsi have been found satisfactory, though pressures of up to 300 kpsi may in some cases be preferable in order to prevent the compact fom disintegrating at a later time. At this stage the compact is an intermediate product only. Such intermediates are called "green products" in the art of powder-sintering. The pellets (green product) are put into the specially devised sintering apparatus in which high hydrogen-pressure and mechanical stress are applied simultaneously. A furnace is placed round the apparatus, and a certain temperature is set and closely controlled. For example, for pellets consisting of $MNi_{4.15}Fe_{0.85}$ (M standing for "Mischemetall", a known mixture of rare earth elements) and Al-powder as embedding metal, a sintering-temperature of 150° C. was found to be optimal. Accordingly, a hydrogen pressure of about 250 at. to 300 at. was maintained, exceeding the equilibrium pressure by about 40 at. It is important that the hydridable metal hydride become fully hydrided so that the particles are fully expanded when sintered. This prevents the compact formed from later disintergrating due to volume expansion of the hydridable metal.

According to another embodiment, which may be found to be both more convenient and economical, the hydrided powder mixture is introduced directly into the sintering furnace, in which mechanical stress, hydrogen pressure and temperature are applied to the powder rather than to pellets made therefrom as in the preceding embodiment. This saves the intermediate step of preliminary cold compaction.

The mechanical stress exerted upon the pellets within the sintering furnace, is an essential element in the preparation of the metal-embedded porous metal hydride compacts according to the present invention. The purpose of the mechanical compressive stress is to assist the flow of the embedding materials during the sintering process at the relatively low temperature which is maintained low in order to prevent any chemical reaction between the hydride and the metal constituents. The low temperature results in sintering at a low process rate; but this is to some extent counteracted by the mechanical compressive stress applied, which acts to enhance the sintering.

The method according to the present invention is suitable for use with most of the metal hydrides, but is particularly suitable for hydridable metals selected from the group consisting of alloys of the type $AB_5$, such as La $Ni_5$, $MNi_{4.15}Fe_{0.85}$ and $CaNi_5$ as well as FeTi(X) types of alloys where X is an additive alloying element such as Mn, Ni, Co and other suitable metals. The method can be adapted to any rechargeable metal hydride system.

For a better understanding of the invention, the following drawings are presented:

Figure 1:
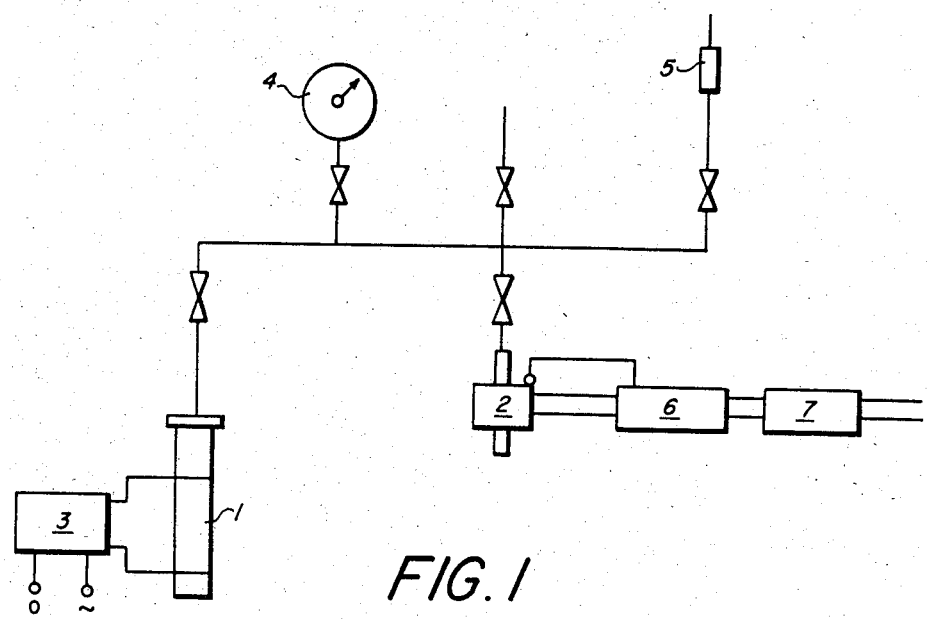
FIG. 1 is a schematic representation of the set-up for producing the sintered metal-embedded pmh compacts of the invention, containing the special apparatus of the invention and ancillary devices.

Referring to FIG. 1, the pellets made of the mixture of reacted hydride and metal powders are placed in the sintering cylinder (2), which is then sealed, connected to a hydrogen supply line (8), and placed in a furnace (not shown for the sake of simplicity). The furnace is connected to a temperature-controlling power supply (6), (7), while the hydrogen supply line is provided with an analogue pressure measuring device (5), and a pressure gauge (4). The hydrogen pressure is generated in the high-temperature reactor (1), heated by a furnace (not shown), which is powered by a temperature-controlling power supply (3).

Figure 2:
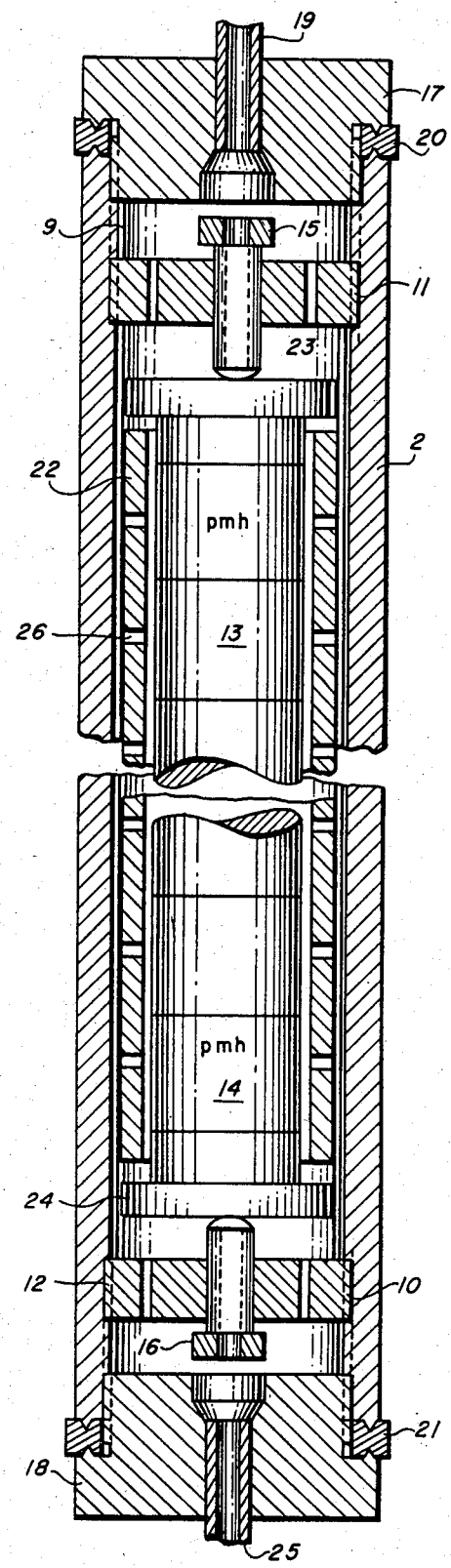
FIG. 2 is a cross-section of the sintering furnace which has been found to be particularly suitable for the present invention.

FIG. 2 shows the actual sintering cylinder (2), which is provided with two internal screw threads (9) and (10), into which fit bolts (11) and (12). Bolts (11) and (12) are perforated along their axes by threaded holes into which fit bolts (15) and (16). The ends of the sintering cylinder are hermetically closed by plugs (17) and (18). Through plug (17) pass tubes (19) and (25), which serve as connections to the pressurized hydrogen supply. The plugs are sealed by means of soft copper seals (20) and (21), as known to the art.

Pellets (13) and (14), made of the mixture of hydrided metal hydride and metal powders are placed in a sleeve (22), the wall of which is pierced in several places (26). Plungers (23) and (24) are placed at either end of the sleeve, and the sleeve thus charged is placed in the space between the bolts (11) and (12). These bolts are then screwed in, and mechanical pressure on the pellets through the plungers (23) and (24) is exerted by tightening bolts (15) and (16). High-pressure hydrogen is admitted through the tubes (19) and (25), and passes into the space occupied by the pellets via the screw threads. It may be found advisable to aid penetration of the hydrogen by perforating bolts (11) and (12), and to aid its distribution throughout the space between these bolts by externally spirally grooving the wall (not shown in the Figure) of the sleeve (22) in addition to the perforations (26) in its wall.

While the invention will now be described in connection with certain preferred embodiments in the following examples, it will be understood that it is not intended to limit the invention to these particular embodiments, which are presented by way of example and for purposes of illustrative discussion. It is, on the contrary, intended to cover all alternatives, modifications and equivalents as may be included within the scope of the invention as defined by the appended claims.

EXAMPLE 1

Figure 5:
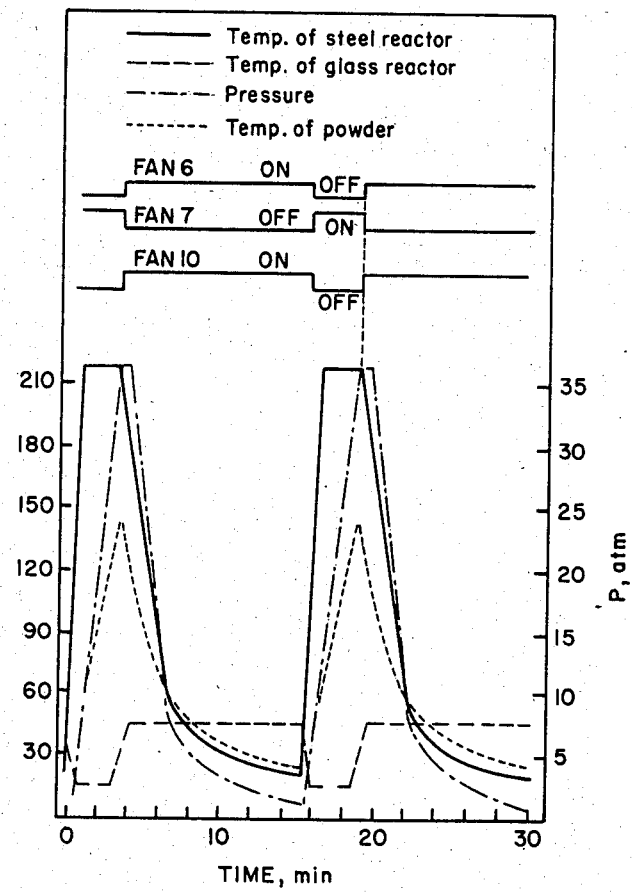
FIG. 5 is a graph showing temperature and pressure vs. time during one cycle of hydrogen desorption-absorption.
Figure 3:
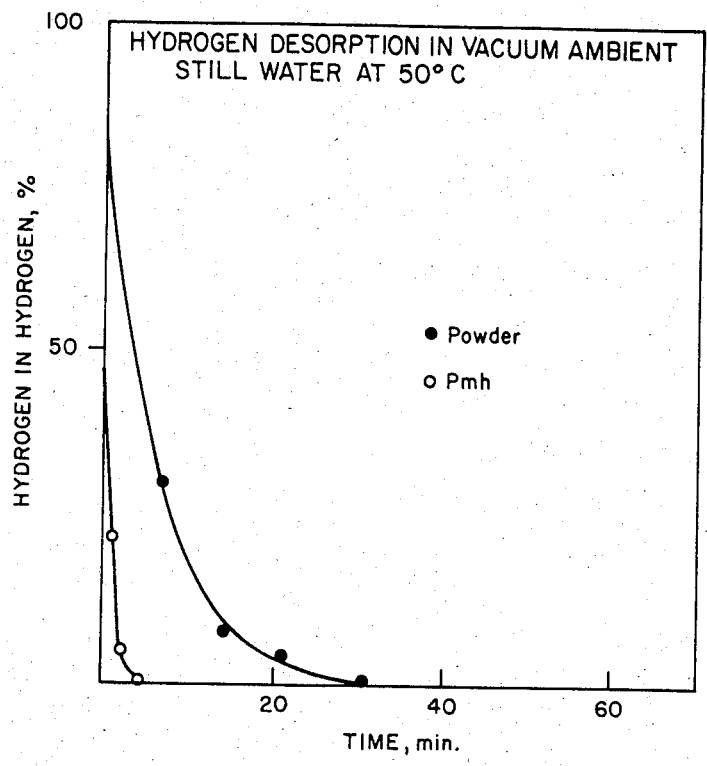
FIG. 3 is a graph comparing hydrogen desorption, into vacuum, from powder and from sintered metal-embedded pmh compacts of the invention when heated by an ambient of still water at 50° C.
Figure 4:
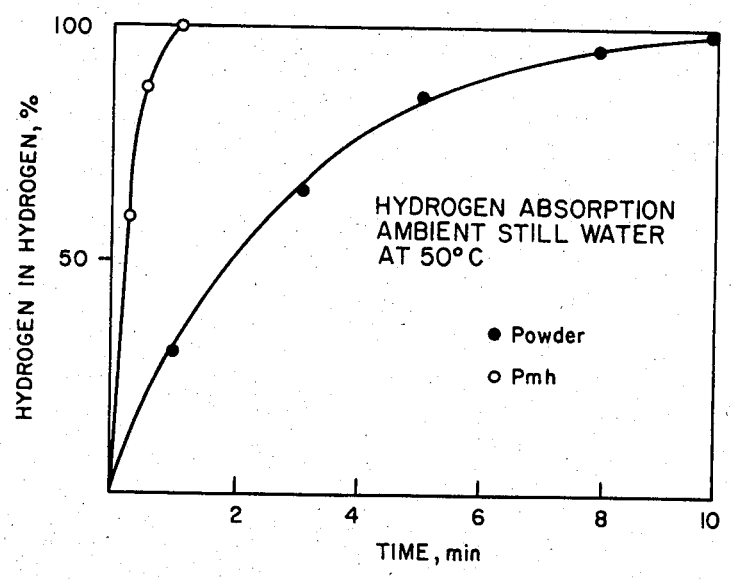
FIG. 4 is a graph comparing hydrogen absorption by a powder and by pmh compacts of the invention when heated by an ambient of still water at 50° C.

100 g of finely divided LaNi$_5$ powder of a particle size of 1 to 20$\mu$ were mixed with 25 weight percent fine aluminum powder of a particle size of about 40$\mu$. The mixture was comminuted by griding in a mortar for about ½ hour until entirely mixed. The comminuted mixture was removed from the mortar, placed in a reactor, and contacted with hydrogen at 300 psi for about 15 minutes, when the LaNi$_5$ was found to be completely hydrided as LaNi$_5$H$_6$. The hydrided powder mixture was then compacted in alcohol as a protecting liquid and as a lubricant, a pressure of 300 kpsi being applied at room temperature, whereby compacts of about 0.375" diameter and ¼ to ½" in height were formed. These "green product" pellets were put into the specially devised sintering apparatus in which they were alternately and repeatedly loaded with hydrogen at about 900 psi and evacuated. Following this, the pellets were subjected to mechanical compressive stress of about 30,000 psi and hydrogen pressure of about 3750 psi (250 atm.), the temperature being simultaneously raised to about 200° C. The apparatus was kept under these conditions for about 75 hours, the mechanical compressive stress being restored daily by tightening the bolts (15) and (16) (FIG. 2). For testing the performance and durability of the pellets thus produced, these were cyclically hydrided and dehydrided many times while contained in a transparent cylinder. The results of this procedure are shown in FIGS. 3, 4 and 5. After more than 6000 cycles the pellets had remained substantially intact, merely exhibiting visible small fissures.

EXAMPLE 2

Grains of MNi$_{4.15}$Fe$_{0.85}$, and an Al-alloy were comminuted for 20 minutes in a mortar grinder to a particle size of 1–5$\mu$. The mixture of powders was put into a steel reactor and repeatedly evacuated and charged with hydrogen. The powder mixture was then taken out of the reactor in the loaded state and under the protection of alcohol placed into a 0.375" die, where it was compacted at 350 kpsi and room temperature. "Green product" pellets of about ½" height were thus produced and put into the specially devised sintering apparatus, in which they were repeatedly loaded with hydrogen at about 900 psi and evacuated. Subsequently, the pellets were subjected to mechanical compressive stress of about 30,000 psi and hydrogen pressure of about 3750 psi (250 atm.), the temperature being simultaneously raised to 150° C. The pellets were kept in the apparatus under these conditions for about 48 hours, the mechanical compressive stress being restored daily by tightening the bolts (15) and (16) (FIG. 2).

For testing the performance and durability of the pellets, these were cyclically hydrided and dehydrided while in a transparent cylinder. After more than 6000 cycles the pellets were found to have remained intact, a few superficial fissures being barely discernible.

I claim:

1. A sintering apparatus for preparing improved porous metal hydride compacts consisting of a sintered metal-embedded porous metal hydride, the apparatus comprising:
    (a) means for preparing an intimate mixture, in powder form, of a finely divided hydridable metal alloy hydride and a finely divided metal;
    (b) means for hydriding said powder by charging it with hydrogen, and
    (c) means for sintering the hydrided metal-embedded metal hydride comprising a furnace, means for supplying hydrogen to said furnace at a pressure above equilibrium pressure appropriate to the prevailing temperature, and means for simultaneously applying mechanical stress.

2. A sintering apparatus in accordance with claim 1 which comprises a cylinder hermetically closable at its ends by two plugs (17,18), sealable by means of seals made of a pliable metal (20,21) said plugs being equipped with tubes (19,25) through which pressurized hydrogen is introduced, said cylinder being provided with internal screw threads (9,10) fitting two corresponding bolts (15,16), a sleeve (22) having a perforated wall and located between the said two bolts (11,12), through which the pellets to be sintered are introduced, said sleeve being provided with two plungers (23,24) placed at the end of the sleeve.

3. An apparatus according to claim 2, wherein the penetration of hydrogen into the cylinder is assisted by the bolts (11,12).

4. An apparatus according to claim 2, wherein the distribution of hydrogen throughout the bolts (11,12) is assisted by externally spirally grooving the perforated wall of the sleeve (22).

* * * * *